United States Patent [19]

Kizu et al.

[11] Patent Number: 5,182,677
[45] Date of Patent: Jan. 26, 1993

[54] EDITING SYSTEM AND METHOD OF EDITING WHEREIN A COMMON SCENE IS RECORDED ASYNCHRONOUSLY DIFFERENT MEDIA

[75] Inventors: Sojiro Kizu; Yutaka Saito; Ichiro Ninomiya; Hidehiko Sasho, all of Kanagawa, Japan

[73] Assignee: Sony Corporation, Tokyo, Japan

[21] Appl. No.: 513,688

[22] Filed: Apr. 24, 1990

[30] Foreign Application Priority Data

Apr. 27, 1989 [JP] Japan ............................ 1-108755

[51] Int. Cl.⁵ .......................................... G11B 27/02
[52] U.S. Cl. .............................. 360/14.2; 360/72.1
[58] Field of Search .................... 360/13, 14.1, 14.2, 360/15, 19.1, 27, 31, 72.1, 72.2, 73.02, 73.04, 14.3; 358/185

[56] References Cited

U.S. PATENT DOCUMENTS

| | | | |
|---|---|---|---|
| 3,575,552 | 4/1971 | Grant et al. | 360/13 X |
| 4,351,007 | 9/1982 | Youngquist | 360/13 |
| 4,450,490 | 5/1984 | Fujii et al. | 360/13 |
| 4,491,879 | 1/1985 | Fine | 360/13 X |
| 4,618,897 | 10/1986 | Johnson et al. | 360/15 |
| 4,754,342 | 6/1988 | Duffy | 360/14.1 X |
| 4,979,050 | 12/1990 | Westland et al. | 360/14.1 |

FOREIGN PATENT DOCUMENTS 0279410 8/1988 European Pat. Off. .

OTHER PUBLICATIONS

Patent Abstracts of Japan vol. 9, No. 255 (E-349) (1978) 12 Oct. 1985 & JP-A-60 103 779 (Hitachi Seikakusho) 8 Jun. 1985.

*Primary Examiner*—Andrew L. Sniezer
*Attorney, Agent, or Firm*—Alvin Sinderbrand; William S. Frommer

[57] ABSTRACT

Video program information is edited from plural prerecorded source media onto an edited record medium. Each source medium includes video program information of a common scene which may be recorded at a location on the medium relative to a beginning location thereof that differs from the location relative to the beginning location on another source medium on which the same common scene is recorded. Each source medium includes address data representing discrete positions thereon and when the program information of the common scene is played back concurrently from the plural source media, the address data associated with the respective media also are played back. The played program information is monitored, and when a scene location in the common scene is played back substantially simultaneously from plural source media, the address data from each source medium representing the actual position at which the scene location is recorded on that source medium is stored as synchronized address data. Edit points on individual ones of the source media are selected; and the selected edit points are referenced to the synchronized address data. Hence, and as an example, although the starting point of a common scene may differ from medium to medium, the respective edit points on each medium relative to the starting point of that scene are in phase with each other. Playback of selected segments of video program information from repective source media for recording onto the edited record medium is controlled in accordance with the referenced edit points.

28 Claims, 9 Drawing Sheets

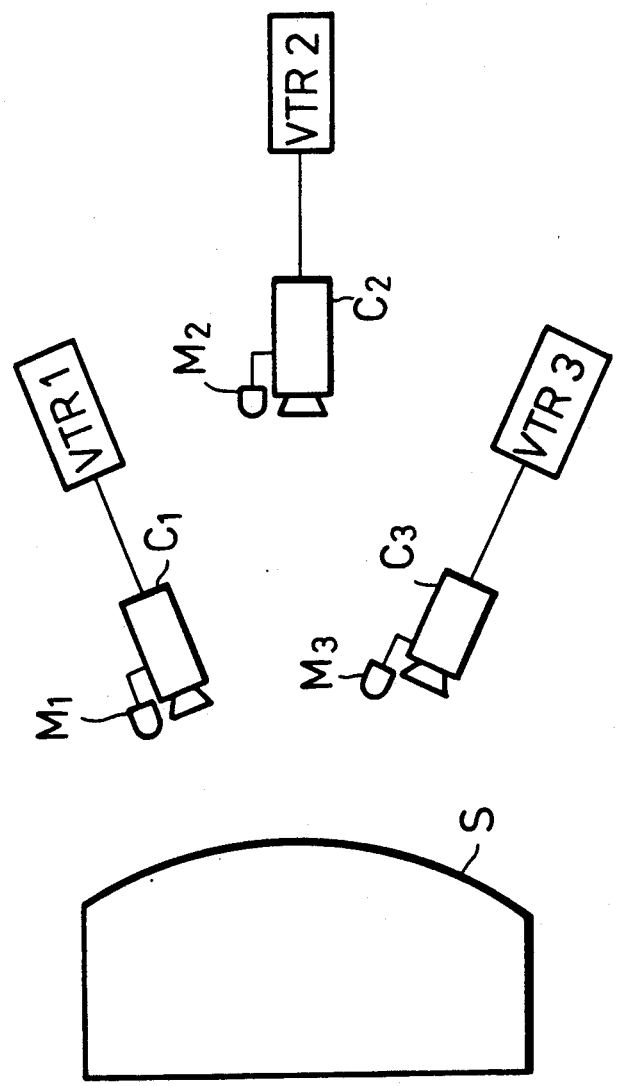
FIG. 1
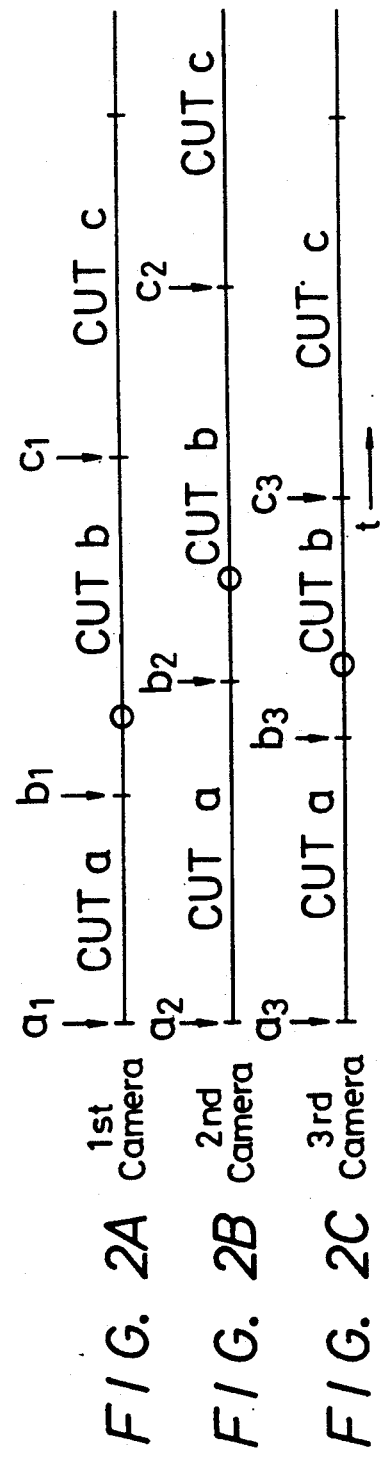
FIG. 2A 1st Camera
FIG. 2B 2nd Camera
FIG. 2C 3rd Camera

FIG. 3

TIME CODES AT CUTS a,b,c

|  | VTR1 | VTR2 | VTR3 |  |
|---|---|---|---|---|
| CUT a | 01MIN 05SEC | 01MIN 07SEC | 01MIN 10SEC | -------- |
| CUT b | 12MIN 11SEC | 13MIN 2SEC | 12MIN 35SEC | -------- |
| CUT c | 20MIN 07SEC | 25MIN 10SEC | 19MIN 50SEC | -------- |

FIG. 8

| VTR NO | SWITCH NO | CUT B CORRESPONDING TIME CODE | |
|---|---|---|---|
| | | PLAYBACK | RECORD |
| 1 | 1 | 00:17:00 | 05:00:00 |
| 2 | 2 | 00:22:00 | 05:05:00 |
| 3 | 3 | 00:25:00 | 05:08:00 |
| 3 | 4 | 00:29:00 | 05:12:00 |
| ------ | ------ | ------ | ------ |

FIG. 10

| REFERENCE CLOCK TIME | TIME CODE | TAPE SPEED |
|---|---|---|
| 01:00:00 | 03:00:00 | 100% |
| 02:30:00 | 04:30:00 | 200% |
| 03:05:00 | 05:40:00 | 90% |
| ⋮ | ⋮ | ⋮ |

PLAY TIME TABLE

FIG. 11

| REFERENCE CLOCK TIME | TIME CODE | RECORD START | RECORD END |
|---|---|---|---|
| 01:00:00 | 04:10:00 | | |
| 02:30:00 | 05:40:00 | ON | |
| 03:05:00 | 06:15:00 | | OFF |
| ⋮ | ⋮ | ⋮ | ⋮ |

RECORD TIME TABLE

EDITING SYSTEM AND METHOD OF EDITING WHEREIN A COMMON SCENE IS RECORDED ASYNCHRONOUSLY DIFFERENT MEDIA

BACKGROUND OF THE INVENTION

1. Field of the Invention

This invention relates to editing techniques and, more particularly, to video editing of a common scene that was recorded asynchronously by, for example, different cameras on respective source media. The present invention also relates to an editing technique wherein time delays that may be imparted to a reproduced video signal that is processed for special effects are compensated such that the processed video signal is recorded at a proper location on an edited record medium. The invention further relates to an improved technique by which edit points in one of several prerecorded scenes may be modified without requiring any modification of the edit points in the remaining scenes.

2. Description of the Prior Art

Video editing systems are well known for merging segments of video program information from different prerecorded source media, such as from different video tapes, onto a final record tape, sometimes referred to as the edit tape. Typically, an operator, or editor, monitors the video programs reproduced from each video tape, selects so-called cut-in and cut-out points from each tape and then re-records each segment defined by its cut-in and cut-out points onto the edit tape. Conventionally, video tapes have recorded thereon address data in the form of time codes to identify discrete positions, or video frames recorded on the tape. In one broadcast standard, such as the SMPTE standard, such time code address data is in the form of hours, minutes, seconds and frames, all referenced to or derived from a time code generator (or other clock, such as a studio clock). Thus, segments on each video tape may be identified by the time codes associated with the beginning (or cut-in point) and ending (or cut-out point) of those segments.

Once the editor establishes the cut-in and cut-out points (also referred to herein as the edit points) on each tape, editing is effected by playing back those source tapes by respective VTR's; and when the first cut-in point is reached, the segment of video program information identified thereby is played back and recorded on the edit tape until the cut-out point of that segment is reached. Usually, the cut-in point of the next segment on another video tape is reached in synchronism with the cut-out point of the segment just played, thus initiating the recording of this next segment on the edit tape. The foregoing operation is repeated from cut-in point to cut-out point and from tape to tape such that, as a result, the selected segments of video information are recorded sequentially on the edit tape.

While the foregoing editing operation may be carried out efficiently and quickly for relatively simple video programs, certain difficulties arise when artistic effects are desired. For example, in recording one of several scenes in sequence, a number of video cameras may be used to record the same scene concurrently from different angles on different video tapes. For instance, if three separate cameras (and, of course, three separate video recorders) are used to record video and audio signals picked up from a particular scene, each video tape will have video and audio information representing that scene recorded thereon. Since each camera is independently manually operated, when a director decides to terminate the recording of that scene, it is likely that each cameraman will end his recording at a different location. Hence, although a common scene is recorded from different angles, the length of the video program recorded on each tape will differ. As a numerical example, and assuming that each video tape begins at the same reference location (such as a time code of 00:00:00), the end of that scene on the first tape may occur at time code location 05:00:00, whereas that scene may continue to be recorded on the next tape until the time code location 05:03:00 and the end of that scene may be recorded on the third tape at the location 05:06:15. Then, when the next scene is recorded by these cameras, the beginning of that next scene may commence from the locations at which the previous scene ended; but here too, the end points of that next recorded scene may differ from tape to tape. Furthermore, each cameraman may begin his recording from a different time point in that scene such that some information recorded on one tape may not be recorded on another. For example, one cameraman may delay by a second or two the beginning of the recording operation, thus missing the information in the first one or two seconds of that scene.

As the foregoing operation continues, differences in the time codes at which a particular scene begins will accumulate from tape to tape. For example, after several scenes have been recorded, a particular scene may commence at time code location 50:30:00 on one tape, but at 63:15:00 on another and at 46:40:00 on yet another. When segments of that scene are to be edited, the editing operation is not as simple and straightforward as mentioned above. For example, assuming that both audio and video signals are recorded on the respective tapes, if the same scene is recorded by different cameras, it is important that, when a segment from one tape is added to a segment from another, both the video and the audio signals from the two tapes be in phase (or synchronized) with each other. If such phase synchronism is not maintained, noticeable discontinuities, particularly in the audio signals, will be detected. This not only is disturbing, it is unacceptable in edited programs of better quality. Thus, when editing video program information that is recorded on separate tapes but represents a common scene, all tapes must be aligned at a common location in the scene before segments thereof can be merged onto the edit tape. Heretofore, such alignment has relied primarily on the skill of the editor to position the tapes at the common scene location when the editing operation is to begin.

Another difficulty in editing arises when special effects are to be imparted to the video signals reproduced from one or more of the video tapes. In a basic editing operation, the cut-in and cut-out points on a source tape as well as those on the edit tape are selected. It is expected that the cut-in points of the source and edit tapes are reached concurrently, whereupon the video program information played back from the source tape is recorded on the edit tape. This operation assumes that there are substantially no noticeable time delays between the playing back of the video program information from the source tape and the recording of that information on the edit tape.

However, when image processing is used to produce special effects, a time delay may be imparted to the reproduced video signals by the image processing apparatus. Consequently, since the source and edit tapes are driven in synchronism to and through their cut-in points, a blank portion will remain on the edit tape following its cut-in point until the delayed, processed video signal finally reaches the edit tape for recording. This blank interval corresponds to the time delay attributed to the image processing apparatus and, depending upon the special effects which are desired, may be variable and unpredictable.

To prevent the aforementioned undesired blank interval from being recorded during an edit operation, a highly skilled editor may delay the movement of the edit tape to compensate for the time delay added to the processed video signal. However, if segments of video program information from different tapes are merged onto the edit tape, synchronous in-phase movement of all tapes is needed, thus preventing the editor from delaying movement of the edit tape. Consequently, the undesired blank interval cannot be avoided easily.

Yet another drawback associated with editing apparatus occurs when one or more source tapes have several scenes recorded thereon. Typically, the editor merges segments of video program information from a particular scene, thereby carrying out a scene-by-scene editing operation. When the editor wishes to make corrections or revisions to an edited tape, for example, if an additional segment is to be merged, or if the sequence of merged segments is to be changed, or if a particular segment is to be replaced with a special effects processed signal, such corrections or revisions may affect other scenes on the edit tape which are not changed because they, nevertheless, require the laborious task of correction to be compatible with the re-edited scene.

OBJECTS AND SUMMARY OF THE INVENTION

Therefore, it is an object of the present invention to provide improved editing techniques which avoid the problems, drawbacks and disadvantages heretofore encountered.

Another object of this invention is to provide an editing technique for recording on an edited record medium segments of a video scene which may have been recorded asynchronously on different source media.

A further object of this invention is to provide an editing technique by which different source media, such as video tapes, containing video program information asynchronously recorded from a common scene are played back in synchronism with each other.

An additional object of this invention is to provide an editing technique which compensates for a time delay imparted to a segment of video information reproduced from a source medium and supplied to the edited record medium through a special effects image processor.

Yet another object of this invention is to provide an editing technique in which several scenes are recorded on plural source media and a particular scene may be edited or re-edited without requiring revisions or modifications to edit information associated with different non-edited or nonre-edited scenes.

Various other objects, advantages and features of the present invention will become readily apparent from the ensuing detailed description, and the novel features will be particularly pointed out in the appended claims.

In accordance with this invention, video program information from plural pre-recorded source media are edited onto an edited record medium, wherein each source medium includes video program information of a common scene which may be recorded at a location relative to a beginning location of that source medium that differs from the location relative to the beginning location on another source medium on which the same common scene is recorded. Each source medium includes address data representing discrete positions thereon and when the program information of the common scene is played back concurrently from the plural source media, the address data associated with the respective media also are played back. The reproduced program information is monitored, and when a selected location in the common scene is played back substantially simultaneously from the plural source media, the address data from each source medium representing the actual position at which the selected location is recorded on that medium is stored as synchronized address data. Edit points on individual ones of the source media are selected; and the selected edit points are referenced to the synchronized address data. Play back of selected segments of video program information from respective source media for recording onto the edited record medium is controlled in accordance with the referenced edit points.

In accordance with one aspect of this invention, the address data on a predetermined source medium is used as referenced edit address data to identify the positions reached by that source medium for each edit point, regardless of whether the edit point identifies a location on that medium or any of the other media. The referenced edit address of each edit point is updated with the difference between the synchronized address data of that source medium and the synchronized address data of another source medium to produce a controlling address which identifies the edit point on that other source medium. The positioning of that other source medium to reach a selected edit point thereon is controlled by the controlling address, whereby all of the source media are advanced in phase synchronism with each other to the respective edit points.

As another aspect of this invention, to determine when a selected location is played back substantially simultaneously from the plural source media, an operator, such as an editor, observes when video pictures reproduced from the individual source media represent approximately the same location in a scene. Typically, video program information is played back from all of the source media concurrently, and an operator, or editor, observes the video pictures thus reproduced. For the embodiment wherein the source media comprise video tapes played by VTR's, individual VTR's may be selectively advanced or delayed relative to the others such that approximately the same location in the scene is observed. The editor then may listen to the audio signals played back from the individual video tapes; and another adjusting operation is carried out until the audio signals played back from the individual video tapes are detected to be in synchronism. A synchronizing signal then is generated to identify the synchronized address data of each source medium at the time such video and audio synchronism is observed.

In accordance with another feature of this invention, the video signals played back from a source medium are image processed to produce special effects before the recording thereof on the edited record medium. The time delay attributed to such image processing is determined, and the phase relationship between that one source medium and the edited record medium is adjusted to compensate for such time delay, whereby a segment of image processed video program information is recorded at a record edit point that is substantially coincident with the play edit point from which that segment is played.

As an aspect of this feature, a blank interval on the edited record medium which would otherwise be present because of the image processing time delay is avoided. Each play edit point on the source medium identifies individual segments to be played back. These play edit points are stored together with a clock time, the latter representing timing information generated by a reference clock at the times the edit points are reached. Similarly, the record edit points that identify the locations on the edited record medium at which the individual segments are to be recorded are stored together with clock times corresponding to each record edit point. During the actual edit operation, the source medium and the edited record medium are advanced in synchronism with clock time signals produced by a clock generator; and when a generated clock time signal is equal to a stored clock time signal, the segment on the source medium identified by the play edit point associated with this clock time is played back and recorded on the edited record medium at the record edit point associated with this clock time. To compensate for the aforementioned image processing time delay, the clock time associated with a play edit point is reduced by an amount substantially equal to the image processing time delay. Thus, when the generated clock time is equal to the reduced clock time, the segment from the play edit point is reproduced, image processed and recorded on the edited record medium.

In accordance with a still additional feature of this invention, outputs from the source media as well as an output from the special effects image processor are coupled to the edited record medium through a switching matrix. Assuming that each source medium has several scenes recorded thereon, an edit record formed of plural scene tables is stored, each scene table including play edit points which identify individual segments of video program information to be played back from the source media, source medium identifying data identifying each source medium from which an identified segment is to be played back, and switch identifying data identifying the sequence in which the switching matrix connects the respective source media to the edited record medium. Editing is achieved by retrieving a desired scene table and then controlling the source media and the edited record medium in accordance with the data contained in that scene table. Data in one scene table, such as one or more play edit points, source medium identifying data or switch identifying data, may be revised so as to change the video program information which is edited. Advantageously, revisions in one scene table may be made without affecting the other scene tables, thus expediting editing operations.

BRIEF DESCRIPTION OF THE DRAWINGS

The following detailed description, given by way of example, will best be understood in conjunction with the accompanying drawings in which:

FIG. 1 is a schematic representation of a scene being asynchronously recorded on several source media by individual video cameras;

FIG. 2A-2C are schematic representation of the video program information recorded on the source media by the cameras shown in FIG. 1;

FIG. 3 illustrates a table of address data representing the locations of individual scenes recorded on the source media by the cameras of FIG. 1;

FIG. 8 illustrates a scene table that is used by the present invention to control an editing operation;

FIGS. 10 and 11 illustrate play and record time tables, respectively, which are used by the time compensator shown in FIG. 9 to control an editing operation;

DETAILED DESCRIPTION OF PREFERRED EMBODIMENTS

Figure 4:
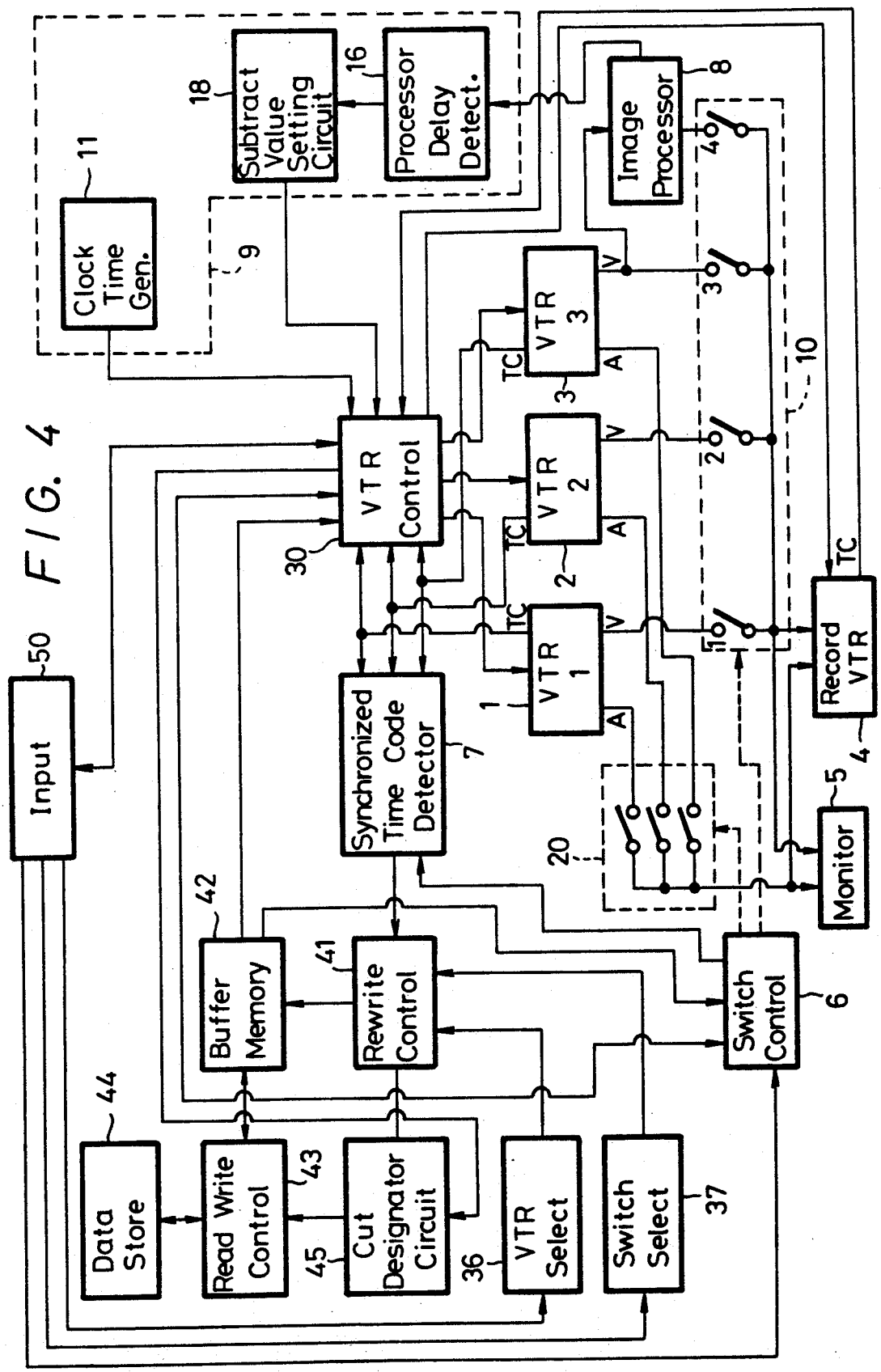
FIG. 4 is a block diagram of one embodiment of an editing system in accordance with the present invention.

Referring now to the drawings, and in particular to FIG. 1, a schematic representation is provided of three separate video cameras C1, C2 and C3 which are used to record three different angles, or views, of a common scene, such as a performance on a stage S. Each camera includes a microphone M1, M2 and M3; and each camera is illustrated as being connected to a video recorder, such as a video tape recorder VTR 1, VTR 2 and VTR 3, respectively. In the illustrated embodiment, there is no interconnection between the cameras or between the VTR's Thus, for the purpose of this description, each camera and VTR combination may be thought of as being operable independently of the others. Consequently, video information is recorded asynchronously on the respective VTR's.

When the arrangement shown in FIG. 1 is used to record a musical performance, for example, having several acts or scenes, the particular scene on stage S being recorded by the VTR's typically is referred to as a "cut". The cameras C1-C3 normally are operated by cameramen under the control of a director. The positioning of the cameras as well as various effects, such as fade-in, fade-out, etc., are controlled by the director. It is expected that, since each camera is individually controlled, the precise time at which a cameraman ends the recording of a scene may differ from camera to camera and, thus, from tape to tape. Nevertheless, successive scenes (sometimes referred to herein as "events"), or cuts, are recorded sequentially on each tape. A schematic representation of the sequence of three cuts, such as cut A, cut B and cut C, as recorded by cameras C1, C2 and C3 on VTR 1, VTR 2 and VTR 3 is illustrated in FIGS. 2A, 2B and 2C, respectively. It is assumed that the beginning of cut A recorded on each VTR is located at approximately the same position on each tape. However, it is seen that cut A ends on VTR 1 before cut A ends on VTR 3 which, in turns, ends before the end of cut A on VTR 2. Thus, cut B begins on VTR 1 before the beginning of cut B on VTR 3 which, in turn, commences before the beginning of cut B on VTR 2. More particularly, it is the location of the beginning of cut B on the respective tapes that is out of phase.

FIG. 2 further illustrates that cut B ends on VTR 3 before the end of cut B on VTR 1 which, in turn, ends before the end of cut B on VTR 2. Thus, and with respect to the length of the tape in each VTR, cut C begins on VTR 3 before the beginning of cut C on VTR 1 which, in turn, commences before the beginning of cut C on VTR 2.

The circles shown in FIG. 2 identify a particular location in, for example, cut B, as recorded on each of the VTR's. This particular location is the same scene point recorded on VTR 1, VTR 2 and VTR 3 by cameras C1, C2 and C3, respectively, at the respective angles shown in, for example, FIG. 1. FIGS. 2A-2C illustrate the out-of-phase asynchronous nature of this common point as recorded by the three VTR's.

FIG. 3 is a table representing the locations of the beginning of each of cuts A, B and C as recorded on VTR 1, VTR 2 and VTR 3, respectively. It is conventional to record address data in the form of time codes in a suitable longitudinal track on video tape as video information is being recorded thereon. Such time code data identifies discrete positions on the tape and, as an example, the SMPTE time code convention may be used to record the time code in terms of hours, minutes, seconds and video frames. For convenience, the table shown in FIG. 3 simply represents the time code in terms of minutes and seconds. The time codes depicted in the table of FIG. 3 represent the respective beginnings of cuts A, B and C as recorded by VTR 1, VTR 2 and VTR 3.

With the scenes asynchronously recorded on the respective video tapes in the format shown in FIGS. 2A-2C and summarized by the table shown in FIG. 3, it will be recognized that simple editing of different segments from the different tapes onto an edited record tape may result in the recording of discontinuous segments. For example, if different segments from cut B are to be edited onto the edited record tape, the alignment of the beginning of cut B on each recorded (or source) tape during the edit operation still may not assure that a particular point in the cut is reached simultaneously on each tape. Thus, the cuts may be thought of as being out of alignment and not synchronized, even though the beginning of each cut may be aligned from tape to tape. It will be appreciated that an aligned cut means that the beginning of a cut, or scene, is reached simultaneously on each tape by the device used to reproduce the video information thereon. Typically, such reproducing devices are video tape recorders and are referred to herein as play (or playback) VTR's.

If, after recording cut A, each of VTR 1, VTR 2 and VTR 3 is disposed in its pause mode awaiting cut B, it is likely that each VTR will begin its recording of cut B at a slightly different time. That is, one cameraman may respond faster to a "start" direction from the director than another. Thus, even if these start points B1, B2 and B3 are aligned from tape to tape during an edit operation, the end of a particular segment on one (known as the cut-out point) may not be synchronized with the beginning of an adjacent segment on another (known as the cut-in point). Consequently, the audio and video signals recorded on the edited record medium exhibit discontinuities at the junctions of segments from the different tapes re-recorded in, for example, an assemble or insert edit operation.

In one embodiment of the present invention, an edit operation is carried out once a particular point, referred to as the "scene location" (or selected location), is reached substantially simultaneously on each tape. That is, the video tapes represented in FIGS. 2A, 2B and 2C are reproduced by individual play VTR's; and when the desired scene location is reached substantially simultaneously while all three tapes are played concurrently, alignment is noted. Thereafter, various segments from the individual tapes may be re-recorded on the edited record tape without suffering undesired discontinuities therein. One example of an embodiment of apparatus for synchronizing the edit operation is illustrated in FIG. 4 wherein play VTR's 1, 2 and 3 supply segments of pre-recorded video program information to a recording VTR 4 to produce an edited record medium. It will be appreciated that, although play VTR's are illustrated and described herein, other source media may be used to supply segments of prerecorded video program information, such as video disks, the latter being prepared from video information recorded by the arrangement shown in FIG. 1. It will also be recognized that although three play VTR's (or three source media) are illustrated, any desired number of source media may be used to supply to recording VTR 4 individual segments from each.

The apparatus shown in FIG. 4 is comprised of a monitor 5, a synchronized time code detector 7, switching matrices 10 and 20, a VTR controller 30, a rewrite control circuit 41, a buffer memory 42, a data store 44 and an input device 50. Play VTR's 1, 2 and 3 are coupled to VTR controller 30 and are adapted to be controlled by the VTR controller. Similarly, recording VTR 4 is coupled to and controlled by the VTR controller. Depending upon various select and control signals supplied to VTR controller 30, as will be described below, the operation of each VTR is controlled in a play mode, a record mode and forward and reverse tape movement. It will be appreciated that analogous operations are controlled by an analogous controller in the event that play VTR's 1, 2 and 3 are replaced by other source media.

Each VTR includes a time code output TC which produces the time code data read from each tape. It is recognized that this time code data is used to control the positioning of the tapes in the play and recording VTR's and time code data is used to address a tape to gain access to a desired location thereon for reproducing or recording video information at that location. The time code outputs of VTR's 1, 2, 3 and 4 are coupled to VTR controller 30. The time code outputs of the play VTR's also are coupled to synchronized time code detector 7.

Each play VTR includes a video output V and an audio output A to supply video and audio signals respectively reproduced from the tape therein. Similarly, recording VTR 4 includes video and audio inputs for recording both video signals and audio signals on the tape therein. The video outputs V of the play VTR's are coupled to the video input of the recording VTR by a video switching matrix 10. Similarly, the audio outputs of the play VTR's are coupled to the audio input of the recording VTR by an audio switching matrix 20. The switching matrices are illustrated schematically as electromechanical switches controlled by a switch control circuit 6 but are recognized as being formed as solid state switching devices. The outputs of the video and audio switching matrices also are coupled to respective video and audio inputs of monitor 5 to permit an operator, such as the editor, to view the video pictures and to listen to the audible information played back by the play VTR's.

In the illustrated embodiment, a particular play VTR, such as VTR 3, is coupled to an image processor 8 which is adapted to process the video signal supplied thereto and thereby enable special video effects to be displayed. One example of image processor 8 is disclosed in U.S. Pat. No. 4,791,581, assigned to the assignee of the present invention. In the interest of brevity, the image processor is not explained further herein but is described more particularly hereinbelow in conjunction with FIGS. 8 and 9. For the moment, suffice it to say that the processed video signals produced by the image processor are coupled to video switching matrix 10 to be supplied to recording VTR 4 and monitor 5. Another output of image processor 8 is coupled to time compensator 9 for a purpose described hereinbelow in conjunction with FIG. 9.

Synchronized time code detector 7 is coupled to switch control circuit 6 and is adapted to respond to a signal supplied from the switch control circuit to apply the respective time codes then being reproduced by VTR's 1, 2 and 3 to rewrite control circuit 41. The time codes supplied by the synchronized time code detector are referred to as synchronized time codes for a purpose soon to be described.

Rewrite control circuit 41 is coupled to buffer memory 42 and is adapted to supply to the buffer memory the synchronized time codes received from synchronized time code detector 7. The rewrite control circuit also is coupled to a cut designator circuit 45 to receive therefrom the designation of a desired cut, or scene, such as cut A, cut B, cut C, etc. Cut designator circuit 45 is coupled to VTR controller 30 and is adapted to receive a cut control signal as a function of, for example, the time codes received by the VTR controller from play VTR's 1, 2 and 3.

Rewrite control circuit 41 also is illustrated as being connected to receive select signals generated by a VTR selector 36 and a switch selector 37. The purpose of these selector circuits and their cooperation with rewrite control circuit 41 are described below in conjunction with FIG. 8.

Buffer memory 42, in addition to being coupled to rewrite control circuit 41, is coupled to data store 44 via read/write control 43. Information temporarily stored in the buffer memory is adapted to be written into data store 44, which may be a RAM, by way of the read/write control. Similarly, information stored in data store 44 may be read therefrom by read/write control 43 and stored temporarily in buffer memory 42. The buffer memory is adapted to store edit records representing the edit points of respective tapes thus identifying segments which are to be played from those tapes and re-recorded on the edited record medium, the sequence in which those segments are to be played and re-recorded, and the particular cut, or scene which contains those edit points. One example of a typical scene table included in an edit record is illustrated in FIG. 8 and will be described below. It is appreciated that the data identifying the edit points and the particular VTR from which those edit points are played back is supplied from buffer memory 42 to VTR controller 30. Data representing the sequence in which the segments are reproduced from the individual VTR's is supplied from the buffer memory to switch control circuit 6. The switch control circuit also interacts with the VTR controller, as illustrated by the connection therebetween.

Figure 13:
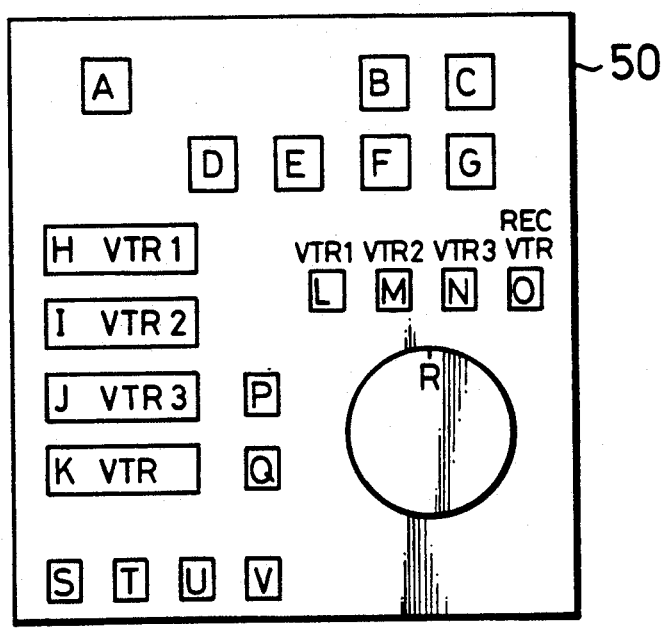
FIG. 13 is a schematic representation of an editing control panel.

An input device 50, adapted to be manually operated by an editor, is coupled to VTR controller 30, switch control circuit 6, VTR selector 36 and switch selector 37. The input device includes switches, tape transport controls, time code displays, and the like, adapted to be used by the editor for controlling an edit operation. One example of a suitable front panel of the input device is illustrated in FIG. 13 and is described below.

An example of the operation of the apparatus illustrated in FIG. 4 now will be described. Let it be assumed that video tapes having the video program information of cuts A, B and C as illustrated in FIGS. 2A–2C are loaded onto VTR's 1, 2 and 3, respectively. As mentioned above, these video tapes are asynchronously recorded and, thus, the particular scene location in cut B on the tape played by VTR 1 is expected to be out of alignment with that same scene location on the tapes played by VTR 2 and by VTR 3. Thus, if a segment from the tape played by VTR 1 is followed by a segment played by VTR 2, it is anticipated that a noticeable, undesired discontinuity will be present when the edited record tape is played back. Accordingly, the apparatus of FIG. 4 first is operated by the editor to bring the tapes played by the VTR's 1–3 into alignment.

The editor operates input device 50 to supply suitable control signals to VTR controller 30 such that VTR's 1, 2 and 3 operate concurrently. Video switching matrix 10 is controlled by switch control circuit 6 in response to a suitable input signal produced by input device 50 to couple the video signal produced by a desired one of the play VTR's to monitor 5. By switching from one VTR to another, the editor observes the video program information then being reproduced by the selected VTR. Preferably, during this initial review, all of the play VTR's operate concurrently.

By operating appropriate ones of the switches and controls of input device 50, the playback operation of one VTR may be advanced or delayed relative to the playback operation of the others. By selectively delaying and advancing the video tapes played by these VTR's, and by observing the video pictures played back from the individual VTR's, the editor may determine when approximately the same location in the scene represented by cut B is reached simultaneously by VTR's 1–3. It is expected that this empirical alignment merely is approximate and, in fact, each VTR reaches the desired scene location at slightly different times.

Figure 6:
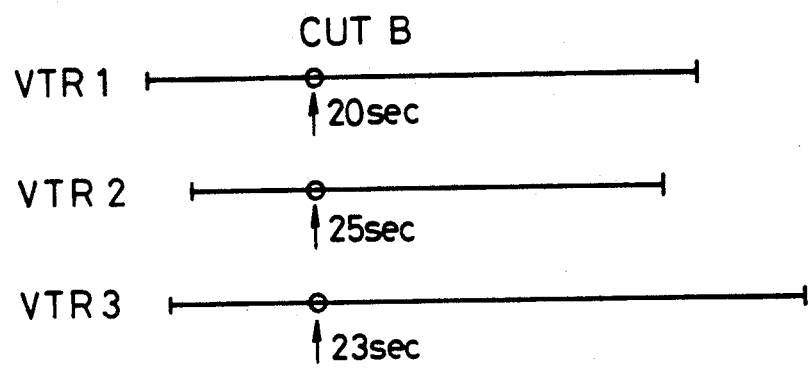
FIG. 6 is a schematic representation of phase-synchronized, or aligned, source media having asynchronously recorded video program information thereon.

Next, switch control circuit 6 is controlled by input device 50 to connect the audio signals played back from a desired one of VTR's 1–3 to monitor 5. By following substantially the same procedure discussed above, that is, by selectively advancing and delaying the play VTR's relative to each other, the editor may determine that the audible sounds reproduced from the audio signals are in phase with each other. When the audio and video signals reproduced concurrently from all of the play VTR's are in phase, the respective tapes are in alignment. At that time, switch control circuit 6 responds to the operation of input device 50 by the editor to supply a trigger signal to synchronized time code detector 7. This trigger signal functions as an enable signal to couple the time codes then supplied to the synchronized time code detector from VTR's 1–3 to rewrite control circuit 41. These time codes are designated as synchronized time codes and are written into buffer memory 42. From the buffer memory, these synchronized time codes are written to data store 44 by read/write control 43. FIG. 6 illustrates schematically the synchronized time codes from VTR's 1-3, as detected by synchronized time code detector 7. Thus, and as an example, when the scene location is reached simultaneously by VTR's 1-3, the time code read from the tape by VTR 1 is 00:20:00, the time code read by VTR 2 is 00:25:00 and the time code read by VTR 3 is 00:23:00. Hence, because of the asynchronous recording of cut B, the time code read from VTR 1 lags the time code read from VTR 2 by five seconds and lags the time code read from VTR 3 by three seconds. These synchronized time codes detected by synchronized time code detector 7 are supplied to buffer memory 42 and then written to data store 44.

Preferably, at the time that synchronized time code detector 7 supplies the synchronized time codes shown in FIG. 6 to rewrite control circuit 41, cut designator circuit 45 is operated by VTR controller 30 to supply to the rewrite control circuit a cut (or scene) designation representing that the synchronized time codes are produced during cut B. Accordingly, data store 44 stores the synchronized time codes and the scene identification in which those synchronized time codes occur. It will be appreciated that when this synchronizing operation is repeated for other scenes, the synchronized time codes and scene identifications therefor likewise are stored in data store 44.

When the synchronized time codes are detected and stored in data store 44, the editor may carry out an edit operation relatively easily. As is known, in a typical edit operation, various edit points on the respective video tapes are identified as cut-in and cut-out points, and the segment of video program information which is recorded between the cut-in and cut-out points is played back and re-recorded on the edited record tape. These edit points are identified by the time codes reproduced from the video tape. Although an edit operation can be implemented before the synchronized time codes are determined, the aforementioned difficulty of discontinuities is avoided if the edit points first are referenced to the synchronized time codes. These edit points may be selected by operating input device 50 (as will be described below) while observing on monitor 5 the desired program information then being reproduced.

Preferably, and since VTR's 1-3 are operated concurrently, each edit point may be selected and identified as a discrete time code produced by, for example, VTR 1. Of course, the particular VTR from which a segment of program information is to be extracted and re-recorded is identified. Therefore, when the editor observes that segment reproduced from, for example, VTR 2, its corresponding edit point may be selected by the editor and the time code then produced by VTR 1 is supplied by VTR controller 30 to buffer memory 42 for storage in data store 44. Hence, as each edit point is selected by the editor, an identification of the VTR which plays the desired segment as well as the corresponding location of that segment on VTR 1 are supplied to and stored in the data store. At this time, the video signals which are reproduced by the play VTR's merely are displayed on monitor 5 but are not yet recorded on the edited record tape by recording VTR 4.

An example of the time code data and VTR identifying data stored in data store 44 for a particular cut, or scene, is illustrated in FIG. 8. It is seen that the data of FIG. 8 includes the identification of a switch included in video switching matrix 10. This switch identification may be used for the operation wherein the video output of a VTR, such as VTR 3, is supplied directly to the switching matrix or is supplied thereto via special effects image processor 8. The switch identifying data thus may be used to select a special effect during the edit operation.

After a proposed edit operation of the aforementioned type is completed, that is, after each edit point, VTR identifying data and switch identifying data are selected and stored as an edit record in data store 44, this edit record may be read out and used to control an automatic edit operation. For example, if the edit configuration established for cut B, such as shown in FIG. 8, is to be implemented, input device 50 is operated such that VTR controller 30 supplies to cut designator circuit 45 a request to read from data store 44 the edit record associated with cut B. This edit record for a particular cut is referred to as a scene table; and the requested scene table is read from data store 44 by read/write control 43 and stored temporarily in buffer memory 42. In addition to the scene table, the synchronized time codes for cut B also are read from data store 44 and stored in the buffer memory. The play edit points are supplied from the buffer memory to VTR controller 30 and the switch identifying data are supplied to switch control circuit 6. Although the play edit points are stored as time codes derived from VTR 1, VTR controller 30 converts those time codes to the time codes for VTR 2 and VTR 3 so as to identify the discrete positions on the tapes being played by these VTR's and thereby reproduce a desired segment therefrom when the preselected edit point is reached.

Figure 5:
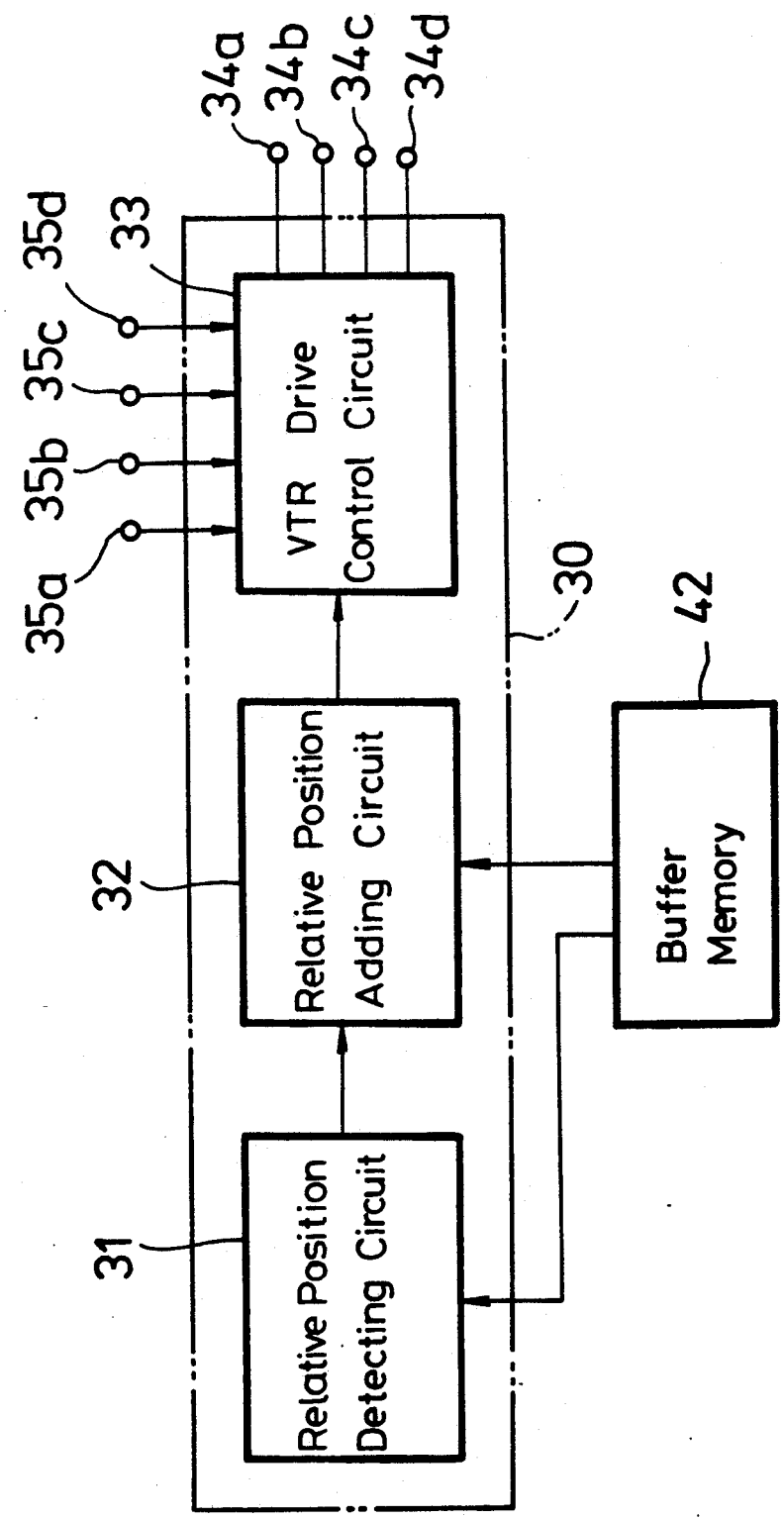
FIG. 5 is a block diagram of the VTR control circuit shown in FIG. 4.

The manner in which VTR controller 30 operates to convert the stored time codes to time codes associated with VTR's 2 and 3 will be described below in conjunction with FIG. 5. It will be explained that, since all of the play VTR's are operated in phase relative to the scene location that had been detected previously, the time codes identifying the respective edit points of, for example, VTR 2 and VTR 3 are referenced to the synchronized time codes. Hence, the time codes provided by VTR 1 when the edit points were selected are easily converted to the time codes of VRT's 2 and 3, which time codes identify portions of the video program information which are all in phase.

Figure 7A:
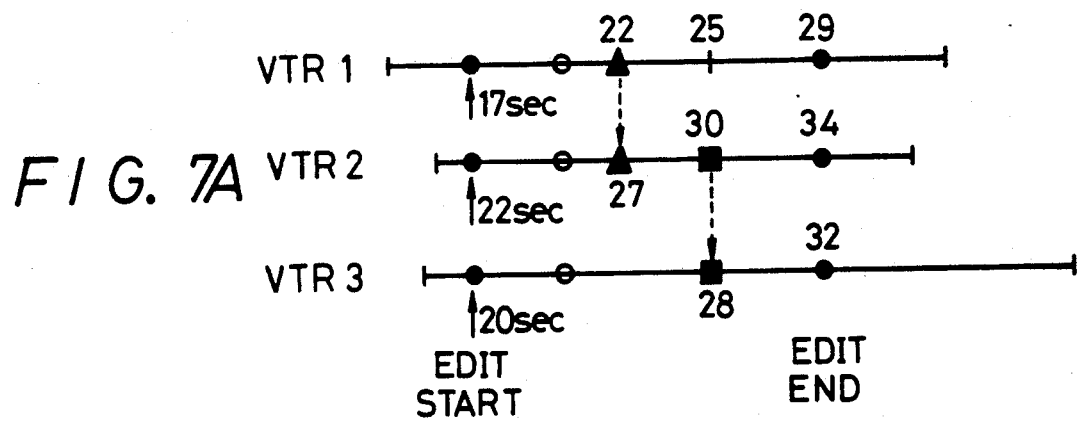
FIGS. 7A and 7B are schematic representations of an editing operation carried out on the phase-synchronized source media shown in FIG. 6.
Figure 7B:
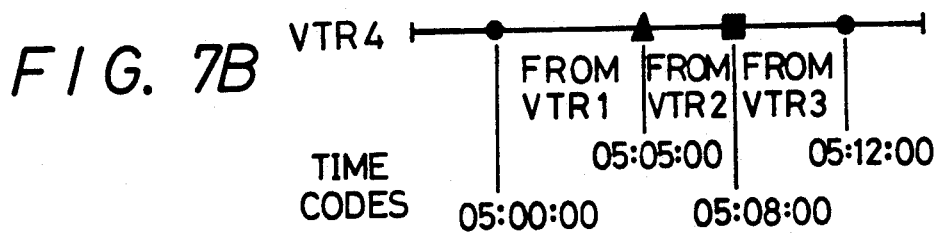

FIGS. 7A and 7B are schematic representations of three segments reproduced from VTR 1, VTR 2 and VTR 3 and re-recorded on recording VTR 4. It is appreciated that the synchronized time codes which are read from data store 44 and supplied via buffer memory 42 to VTR controller 30 serve to drive VTR 1, VTR 2 and VTR 3 in phase. That is, the tape played by each of these VTR's reaches the scene location (identified in FIG. 7A as the open circle) simultaneously. It is assumed that an edith start point, or cut-in point, of VTR 1 is selected at a time code corresponding to, for example, 00:17:00. When the cut-out point on VTR 1 (designated by the triangle of FIG. 7A) is reached, VTR controller 30 controls VTR 2 such that its cut-in point (also represented by the triangle in FIG. 7A) is reached simultaneously. AT that time, switch control circuit 6 controls switching matrices 10 and 20 to interrupt the connection of VTR 1 to recording VTR 4 and now connect play VTR 2 to the recording VTR. It is appreciated that, since all of the VTR's operate in synchronism and since the video tapes being played thereby are in alignment, the beginning of the segment extracted from play VTR 2 is in phase with the end of the segment which had been extracted from VTR 1.

Next, when the previously selected cut-out point on VTR 2 is reached (represented as the square in FIG. 7A), the cut-in point on VTR 3 is reached simultaneously. The VTR controller controls the operation of VTR 3 to insure this simultaneous arrival of its cut-in point with the arrival of the cut-out point on VTR 2. At that time, switch control circuit 6 controls switching matrices 10 and 20 to change over the connection of recording VTR 4 from play VTR 2 to play VTR 3. Here too, the synchronous, in-phase operation of all of the play VTR's assures that the beginning of the segment extracted from VTR 3 is in phase and continuous with the end of the segment extracted from VTR 2. Play VTR 3 continues to reproduce the video program information previously recorded on the tape reproduced thereby until the edit end point is reached.

FIG. 7B illustrates the edited record tape produced by recording VTR 4 from the segments of video information supplied thereto from VTR 1, from VTR 2 and from VTR 3.

The manner in which VTR controller 30 operates now will be described in conjunction with the block diagram thereof shown in FIG. 5. As illustrated, the VTR controller includes a relative position detecting circuit 31, a relative position adder 32 and a VTR drive control circuit 33. The relative position detecting circuit is coupled to buffer memory 42 and is adapted to receive the synchronized time codes which had been supplied by synchronized time code detector 7 and stored in data store 44 when the editor determined that the three play VTR's reproduced the scene location simultaneously. Detecting circuit 31 is adapted to determine the difference between the synchronized time codes derived from VTR's 1 and 2 as well as the difference between the synchronized time codes derived from VTR's 1 and 3. In the example illustrated in FIG. 6, the difference between the synchronized time codes derived from VTR's 1 and 2 is equal to 00:05:00; and the difference between the synchronized time codes derived from VTR's 1 and 3 is 00:03:00. These respective time code differences are supplied by detecting circuit 31 to relative position adding circuit 32.

Adding circuit 32 is coupled to buffer memory 42 and, during an edit operation receives from the buffer memory the time codes representing the previously selected edit points stored in data store 44. It is recalled that these edit points are identified as time codes derived from VTR 1. The purpose of adding circuit 32 is to convert those time codes into the time codes of VTR 2 and VTR 3. For example, and with reference to FIG. 7A, let it be assumed that the illustrated edited points had been selected. Data store 44 stores these edit points as time codes derived from VTR 1. In the illustrated example, these edit points are stored as time codes 00:17:00, 00:22:00, 00:25:00 and 00:29:00. Adding circuit 32 functions to add the differences detected by detecting circuit 31 to the time codes supplied thereto from data store 44 via buffer memory 42. Thus, the cut-in point of VTR 2 represented by the triangle of FIG. 7A is computed by adding the time code difference of five seconds to the time code derived from VTR 1 which represents this cut-in point. Hence, the cut-in point for VTR 2 is calculated as 00:27:00. Similarly, the cut-out point for VTR 2, which is represented by the square shown in FIG. 7A, is calculated by adding the time code difference of five seconds to the time code derived from VTR 1 which identifies this cut-out point. In the illustrated example, this cut-out point for VTR 2 is represented as the time code 00:25:00 from VTR 1 and is calculated as 00:30:00 for VTR 2. This cut-out point for VTR 2 occurs simultaneously with the cut-in point for VTR 3. Since the time code difference between VTR 1 and VTR 3 has been detected as three seconds, this time code difference is added to the time code derived from VTR 1 corresponding to the cut-in point on VTR 3, resulting in a cut-in time code for VTR 3 of 00:28:00. Finally, the cut-out point for VTR 3, which corresponds to the edit end point, is stored in data store 44 as 00:29:00, derived from VTR 1. The cut-out point for VTR 3 thus is calculated by adding circuit 32 as 00:32:00. Thus, the cut-in and cut-out points for the respective VTR's are derived from the edit points stored in data store 44 and are provided by adding circuit 32 to VTR drive control circuit 33 as the time codes which identify the respective cut-in and cut-out points for each VTR.

It is recognized that these individual cut-in and cut-out time codes for the respective VTR's all are referenced to the synchronized time code that had been determined by synchronized time code detector 7 and stored in data store 44. Consequently, VTR drive control circuit 33 uses these time codes, which constitute the referenced edit points, to make certain that the individual video tapes are driven synchronously and in phase with each other.

The VTR drive control circuit includes VTR outputs 34a–34d coupled to VTR's 1-4, respectively. The drive control circuit also includes time code inputs 35a–35d which receive the time codes read by VTR's 1-4, respectively. It is recognized that VTR drive control circuit 33 operates to compare the time codes received at its inputs 35a–35d with the individual time codes for VTR's 1-3 supplied thereto by relative position adder 32 to detect when a time code read from a VTR is substantially equal to the edit point time code supplied from the adder. Upon sensing coincidence of a cut-in time code and a time code read from the VTR, the video program information then being played by that VTR is supplied through switching matrices 10 and 20 to recording VTR 4. Similarly, upon sensing coincidence of a cut-out time code and a time code read from the VTR, the video program information which had been supplied from that VTR through the switching matrices to the recording VTR is interrupted. It will be recognized that a cut-in time code supplied to VTR drive control circuit 33 by adder 32 is derived from a scene table (such as shown in FIG. 8) read from data store 44. Thus, each cut-in point (as well as each cut-out point) is accompanied by switch identifying data that is supplied from data store 44 to buffer memory 42 and thence to switch control circuit 6 to close the identified switches in switching matrices 10 and 20 at the time that the cut-in point is reached.

Therefore, it is seen that, although data store 44 need store only the time codes derived from a single play VTR, such as VTR 1, representing the position of the tape played by VTR 1 at the time that each edit point is reached, whether that edit point identifies a position on the tape played by VTR 1 or the tape played by VTR 2 or the tape played by VTR 3, since all three VTR's operate in phase and in synchronism with each other, the time codes derived from VTR 1 are easily modified so as to represent the time codes for the tapes played by VTR's 2 and 3. Consequently, the edit point for each VTR is easily calculated and used to determine when a selected segment of video program information has been reached. Since all of the edit points are derived from the time code produced by, for example, VTR 1, there is no discontinuity when segments from different VTR's are edited, even though the program information provided by those VTR's had been recorded asynchronously.

Referring to FIG. 8, a so-called scene table is schematically represented. This scene table is stored in data store 44 and is identified by the particular scene represented thereby. In the illustrated embodiment, FIG. 8 represents the scene table for cut B. This scene table identifies the particular play VTR which is selected to play a segment of the prerecorded video program information from the edit point identified by the playback time code, and the scene table also identifies the sequence in which the segments are played back from the respective play VTR's. Moreover, since special effects may be imparted to reproduced video signals by image processor 8, the scene table also identifies the particular connection of video switching matrix 10 by which the reproduced video signals are supplied to recording VTR 4. For example, if special effects are to be imparted to the video information played back from VTR 3, switch #4 in matrix 10 is selected so as to coupled the video output of VTR 3 to recording VTR 4 via image processor 8.

It will be appreciated that FIG. 8 represents the edit points defined by the time codes reproduced from VTR 1 in order to record the segments illustrated in FIG. 7A onto recording VTR 4 to form the edit tape illustrated in FIG. 7B. It is recognized that data store 44 stores several scene tables, each scene table representing the edit information for its corresponding scene. If the editor wishes to revise the edit information for any scene, such revision may be effected easily merely by reading from data store 44 the scene table for a desired scene. For example, the scene table for cut B may be read from data store 44, as by supplying a scene table read out signal from input device 50 through VTR controller 30 to cut designator circuit 45. Once the scene table is read from data store 44 to buffer memory 42, input device 50 may be operated by the editor to control VTR selector 36 so as to change the VTR selected for playback or to change the edit point on that VTR, thereby modifying the segment of video program information to be edited. Likewise, switch selector 37 may be controlled by input device 50 to revise the particular switch in one or both of the switching matrices, for example, to provide special video effects when desired. Of course, a modification of the scene table for one scene, such as for cut B, does not necessarily require a modification to any of the other scene tables stored in data store 44. Thus, a complete review of all of the stored edit information is not necessary when only selected information in a particular scene table is changed.

Returning once again to FIG. 4, let it be assumed that an edit operation selects a segment of video program information reproduced from VTR 3 to be subjected to special video effects. When the selected segment on the video tape reproduced by VTR 3 is reached, switch control circuit 6 actuates switch #4 in video switching matrix 10 such that the reproduced segment of video information is supplied to recording VTR 4 by image processor 8. However, as mentioned above, the video signal supplied through the image processor is subjected to a time delay attributed to the signal processing carried out by the image processor. This delay may be a variable amount and, thus, may not be easily predicted. For example, the image processor may include a so-called frame memory which imparts a delay equal to the time duration of a video frame. A time delay equal to multiple frame delays may be imparted to the video signal, depending upon the special video effects which are selected. The structure and operation of image processor 8 forms no part of the present invention per se; and further description may be found in aforementioned U.S. Pat. No. 4,791,581.

It is recognized that, as play VTR's 1-3 operate, recording VTR 4 likewise operates. Thus, video tape is advanced by each of these VTR's concurrently. From FIGS. 7A and 7B, it is seen that, when a segment of video information is played back from a video tape, that segment is recorded immediately on the edit tape. However, if the video signal is subjected to image processing, that processed signal is not recorded immediately upon its reproduction from the VTR. Rather, the recording is subject to a delay equal to the inherent time delay of the image processor. Consequently, when a segment of video information from, for example, VTR 3 is selected and image processed, no video signals are recorded on the edit tape for a duration equal to the image processor time delay. As a result, a blank interval is recorded (or, more accurately, remains) on the edit tape. This blank interval results in an undesired, noticeable disturbance. In the apparatus shown in FIG. 4, a processing control time compensator 9 is provided to take into account the time delay imparted to the video signal processed by image processor 8 and to compensate for this time delay so as to obviate the blank interval on the edit tape.

Figure 9:
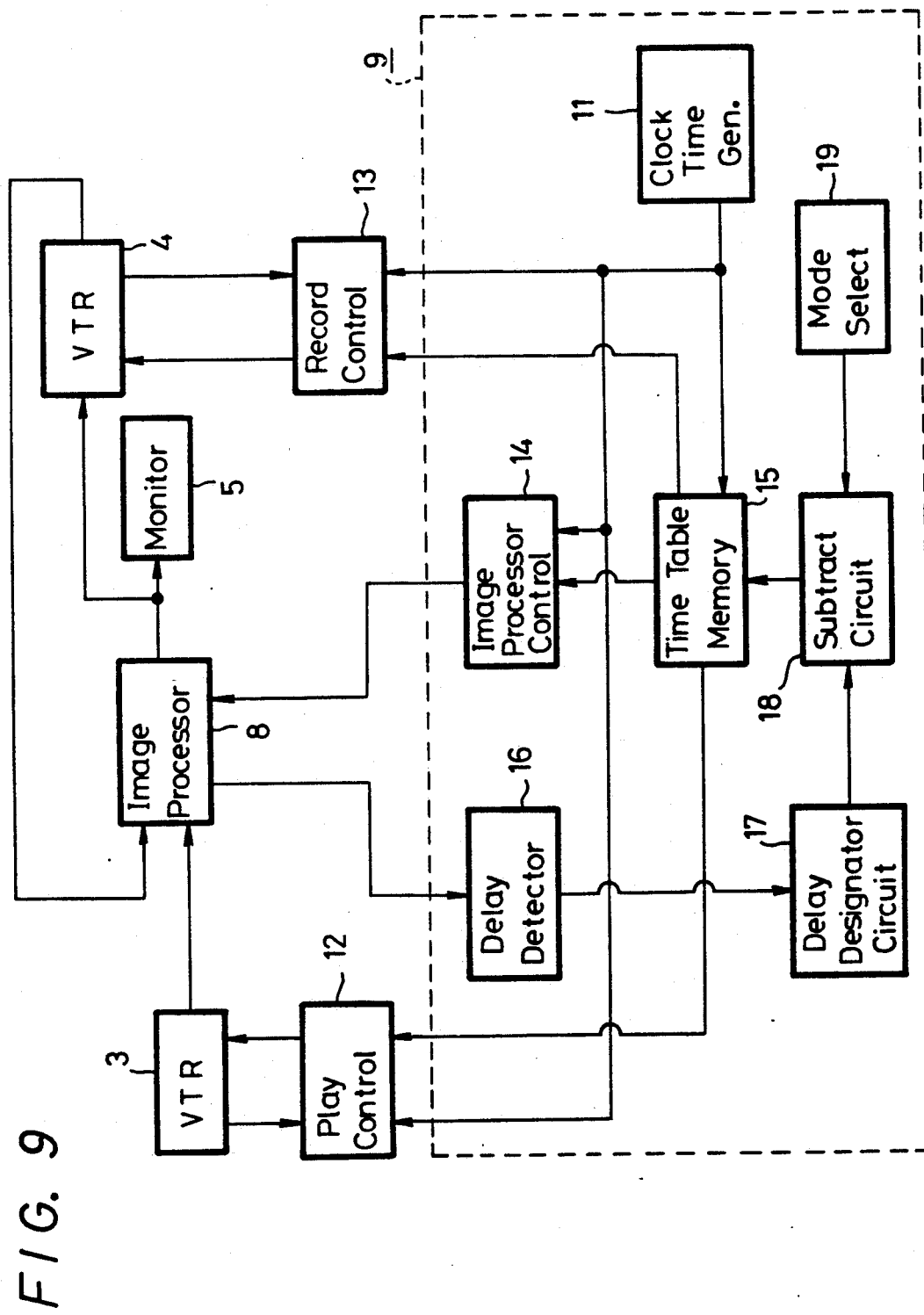
FIG. 9 is a block diagram of the time compensator shown generally in FIG. 4.

Processing time control compensator 9 is shown in greater detail in FIG. 9 and is adapted to advance the time that VTR 3 reaches its cut-in position relative to the time that recording VTR 4 reaches its corresponding cut-in position by an amount substantially equal to the time delay imparted to the video signal reproduced by VTR 3 and processed by image processor 8. By advancing the time that the video tape played by VTR 3 reaches its cut-in point, the processed video signals will be supplied to the usual recording mechanism of VTR 4 at the time that VTR 4 reaches the cut-in point at which this processed video signal is to be recorded. Time compensator 9 includes, inter alia, a clock time generator 11, a time delay detector 16 and a subtracting circuit 18. As will be explained further below, the clock time generator is adapted to supply reference clock times analogous to the time codes reproduced by the VTR's. Thus, the reference clock data is in the form of hours:minutes:seconds:frames. A respective clock time is associated with each edit point such that, when clock time generator 11 generates a particular clock time, the edit point on VTR 3 associated therewith is reached.

Time delay detector 16 is coupled to image processor 8 and is adapted to detect the inherent time delay imparted by the image processor to the video signals supplied thereto from VTR 3. It is expected that this time delay comprises one or more frame time durations. The time delay detected by detector 16 is coupled to subtracting circuit 18 which is adapted to modify the cut-in edit point by an amount substantially equal to the detected time delay. In one embodiment, as will be explained further below, this cut-in edit point modification is achieved by subtracting the detected time delay from the clock data associated with that edit point. It will be recognized that, when the thus-reduced clock time is reached by clock time generator 11, VTR controller 30 will have operated VTR 3 to reach the cut-in edit point. Hence, the segment of video program information reproduced from VTR 3 will be reproduced therefrom at a time advanced from the expected time by an amount equal to the detected time delay of image processor 8. At that time, the edit tape processed by recording VTR 4 will not yet have reached its cut-in point. But, by the time the video signal reproduced from VTR 3 passes through image processor 8 to the recording VTR, the cut-in point on the latter will be reached and the processed video signal will be recorded thereat. Consequently, the edit tape will not be provided with an undesired blank interval preceding this cut-in point.

FIG. 9 illustrates time compensator 9 in greater detail. In addition, and for improved clarity, VTR controller 30 is illustrated as including a play control circuit 12 coupled to play VTR 3 and a record control circuit 13 coupled to recording VTR 4.

Time compensator 9 includes clock time generator 11, time delay detector 16 and subtracting circuit 18, as before, and it also includes an image processor control circuit 14, a time table memory 15, a delay designator 17 and a mode selector 19. Image processor control circuit 14 is coupled to image processor 8 and is adapted to control the image processing operation in accordance with clock signals supplied by clock time generator 11. The image processor control circuit forms no part of the present invention per se and is not further described.

Time table memory 15 is adapted to store a play time table and a record time table of the types illustrated in FIGS. 10 and 11, respectively. The play time table includes time code addresses representing various edit points on the video tape played by VTR 3. Each edit point is associated with clock data which identifies the clock time reached by clock time generator 11 coincident with the edit point. For example, when clock time generator 11 generates the clock time 01:00:00, the edit point identified by time code 03:00:00 is reached. The play time table illustrated in FIG. 10 also contains an identification of the speed at which the tape is to be transported from this edit point to the next.

Similarly, the record time table stored in memory 15, and illustrated in FIG. 11, contains the time codes on the edit tape processed by recording VTR 4 corresponding to the clock times which identify the edit points of VTR 3. The record time table also includes an indication of the cut-in and cut-out points of the edit tape. For example, when the edit tape reaches the time code 04:10:00, no recording occurs. But, it is seen that the position of the edit tape identified by the time code 05:40:00 is a cut-in point at which the recording operation begins. The cut-out point for this recording operation, that is, the location at which the recording ends, is identified as time code 06:15:00. The cut-in and cut-out points correspond to the clock times 02:30:00 and 03:05:00, respectively.

Time table memory 15 is coupled to play control circuit 12 and to record control circuit 13 and is adapted to supply the play time table to the play control circuit and the record time table to the record control circuit. Clock time generator 11 is coupled to the time table memory and also to the respective play and record control circuits. It will be appreciated that the play and record control circuits are adapted to compare the clock times generated by the clock time generator to the clock times stored in the play and record time tables, respectively. This comparison operation is used to control the playback and recording operations of VTR's 3 and 4, respectively.

Delay designator 17 is coupled to delay detector 16 and is adapted to round off the detected time delay to the nearest frame time duration. For example, if a delay on the order of 1/30th second is detected, delay designator 17 produces a time delay quantity of 00:00:01. If time delay detector 16 detects an image processor time delay on the order of, for example, 3.7/30 seconds, delay designator 17 produces a time delay quantity of 00:00:04. The delay designator is coupled to subtracting circuit 18 which, in turn, is coupled to time table memory 15.

The purpose of the subtracting circuit is to subtract the delay time quantity produced by delay designator 17 from the clock time associated with a cut-in edit point stored in the play time table. It is recognized that this effectively advances the clock time at which that cut-in edit point is reached by an amount substantially equal to the time delay inherent in image processor 8. Subtracting circuit 18 may be thought of as rewriting the clock times stored in the play time table of time table memory 15.

The subtracting circuit also is coupled to mode selector 19 which is adapted to establish or cancel the subtracting operation as a function of the edit mode that may be selected by the operator. For example, the mode selector cancels the subtracting operation in the event that a non-editing mode is selected by the operator. If the edit tape that had been recorded by recording VTR 4 is played back through image processor 8 and displayed on monitor 5, if is desired not to modify the clock times that may be stored in time table memory 15; and for this mode the subtracting operation is not carried out.

The manner in which time compensator 9 operates now will be described with reference to the schematic representations shown in FIGS. 12A–12C which illustrate the problem attending the time delay imparted by image processor 8 and the solution to that problem. Let it be assumed that the play time table shown in FIG. 10 and the record time table shown in FIG. 11 are stored in time table memory 15. It will be appreciated that the time tables may be produced when an editor operates input device 50 (FIG. 4) to select segments from VTR 3 which are to be image processed for special effects and then recorded on VTR 4. The clock time data illustrated in FIGS. 10 and 11 are generated by clock time generator 11 during the edit set-up operation, that is, the operation used by the editor to select the desired edit points on the video tape played by VTR 3, to select the mode at which segments of video information are played by the VTR (e.g. normal, fast, slow, etc.) and to select the cut-in and cut-out points for recording those segments on VTR 4.

In the absence of time delay detector 16, delay designator 17 and subtracting circuit 18, when a segment of video information located at time code 04:30:00 on the video tape played by VTR 3 is to be transferred to the edit tape recorded by VTR 4 via image processor 8, the transferred, processed segment will not reach VTR 4 at the time that the position on the edit tape identified by the time code 05:40:00 is reached. This is because the image processor imparts an inherent time delay to the video signals processed thereby. Let it be assumed that this time delay is equal to one frame time, or 1/30 seconds, expressed as 00:00:01. FIG. 12A illustrates the recording of the image processed segment by recording VTR 4. By reason of the time delay attributed to the image processor, the segment played back from location 04:30:00 on the source tape is recorded at location 05:40:01 on the edit tape. Consequently, the interval from time code 05:40:00 to 05:40:01 on the edit tape remains blank.

Figure 12A:
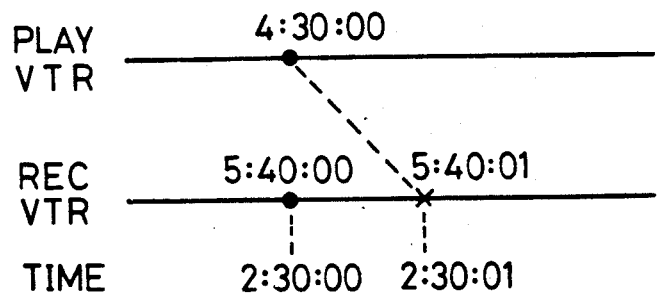
FIGS. 12A-12C are schematic representations of the effects achieved by the time compensator shown in FIG. 9.
Figure 12B:
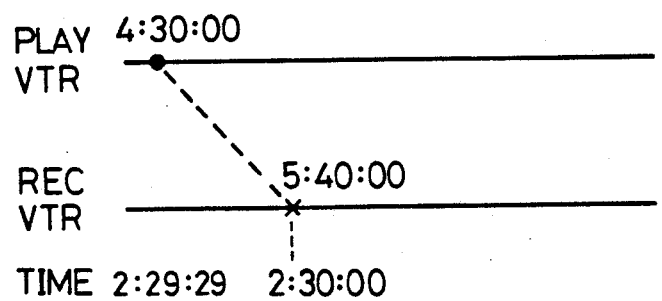
Figure 12C:
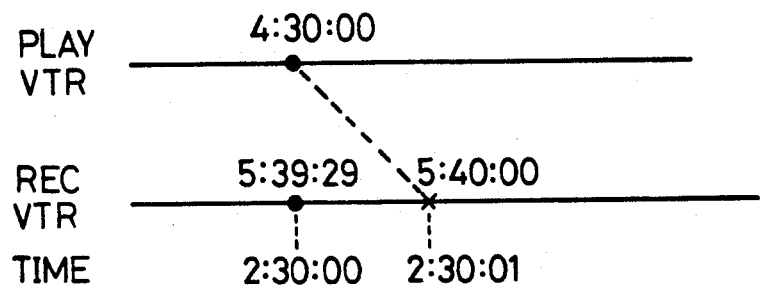

From FIG. 12A it is seen that, since the source tape and the edit tape advance in synchronism, when clock time generator 11 generates the clock time 02:30:00 to identify the edit points on both the source and edit tapes, the source tape is positioned at the location represented by time code 04:30:00 and the edit tape is positioned at the location represented by the time code 05:40:00. In the absence of image processor 8, a segment of video information reproduced from position 04:30:00 will be recorded on the edit tape at position 05:40:00. But, because of the image processing delay, the processed segment of video information is not recorded until the edit tape reaches position 05:40:01.

Subtracting circuit 18 compensates for this time delay. Let it be assumed that delay detector 16 detects an image processing time delay equal to approximately the time duration of the frame. Delay designator 17 rounds off this detected delay time to 00:00:01 and supplies this designated time delay to subtracting circuit 18. At this time, the circuit 18 to carry out a subtracting operation. Accordingly, the clock time 02:30:00 stored in the play time table in memory 15 is rewritten by subtracting from this stored clock time the designated time delay. Therefore, the clock time stored in the play time table and corresponding to the source tape time code position of 04:30:00 is revised to be equal to 02:29:29. This rewritten play time table is supplied to play control circuit 12.

Now, when an edit operation is carried out, play control circuit 12 compares the clock times generated by clock time generator 11 to the revised clock times stored in the play time table. When the generated clock time is equal to the revised, stored clock time of 02:29:29, the position of the source tape corresponding to this clock time is reached and the segment of video information recorded thereon is played back. Thus, the video information recorded at the edit point 04:30:00 is reproduced, supplied to image processor 8 and re-recorded on the edit tape by VTR 4. By the time the processed video signals reach the recording VTR, clock time generator 11 generates the clock time of 02:30:00, whereat the cut-in point of 05:40:00 is reached on the edit tape. Hence, the image processed segment of video information is recorded at this cut-in point on the edit tape, as shown in FIG. 12B. This, of course, is the location at which the segment is intended to be recorded and, therefore, the blank interval noted in FIG. 12A is obviated.

Although not shown, it is recognized that the segment of video information reproduced from VTR 3 continues until a cut-out edit point is reached. From FIG. 10, it is seen that this cut-out point is reached at clock time 03:05:00 which corresponds to the time code position 05:40:00. Furthermore, the source tape is advanced at a speed determined by the tape speed data stored in the play time table. In the example described herein, this segment of video information is reproduced at twice the normal tape speed. The recording of this image processed segment on the edit tape commences at the position identified by time code 05:40:00 (i.e. the cut-in point on the edit tape) and continues until the cut-out point is reached. In this example, the segment is recorded for a duration of 35 seconds and, thus, the cut-out point on the edit tape is identified as 06:15:00, as shown in the record time table of FIG. 11. A comparison of FIGS. 10 and 11 indicates that twice the length of source tape is used to reproduce the segment that is recorded on the edit tape because the source tape is driven at twice the normal speed.

It is appreciated that, if each segment to be reproduced from VTR 3 is to be subjected to image processing, then the clock times stored in the play time table for all of the edit points are reduced by the designated time delay derived from time delay detector 16. When video segments are transferred from the source tape to the edit tape, each clock time signal generated by clock time generator 11 is compared to each clock time stored in the play time table and to each clock time stored in the record time table. The source and edit tapes are controlled by play control circuit 12 and record control circuit 13 such that when the generated clock time coincides with a stored clock time (particularly a rewritten clock time stored in the play time table), the source and edit tapes are positioned at the time codes corresponding to that stored clock time. Then, depending upon the edit data stored in the respective time table, the commanded edit operation is effected. For example, in the play time table, the edit command may determine the speed at which the source tape is transported for playing back the video information thereon. In the record time table, the edit command identifies the cut-in and cut-out points on the edit tape, that is, the points at which re-recording starts and ends.

Although the foregoing has described a time delay compensating operation wherein the clock times stored in the play time table are reduced as a function of the detected image processing time delay so as to advance the time at which an edit point on the source tape is reached, time compensation may be effected by increasing the clock times stored in the record time table by the detected time delay so as to delay the arrival of an edit point on the edit tape. For example, assuming the segment of video information reproduced from the source tape at the clock time 02:30:00 is to be image processed and recorded at cut-in point 05:40:00 on the edit tape, the clock time corresponding to this time code may be rewritten in the record time table as 02:30:01. Thus, and as shown in FIG. 12C, when clock time generator 11 generates the clock time 02:30:00, the edit point identified by time code 04:30:00 on the source tape is reached and the video information thereat is reproduced. At this time, however, the edit tape is positioned at the time code identified by 05:39:29. Then, when the clock time generator generates the clock time of 02:30:01, the cut-in point identified by the time code 05:40:00 on the edit tape is reached and the image processed video signal then is recorded thereat. Hence, the time delay imparted by the image processor is compensated and the undesired blank interval between the cut-out point of the previous segment transferred to the edit tape and the cut-in point of the next-following segment is eliminated.

Referring now to FIG. 13, there is illustrated a schematic representation of an editing control panel included in input device 50 and operable by an editor. For convenience, simplification and brevity, the manner in which this control panel is operated and the effects achieved thereby now will be discussed briefly.

To select VTR 1 for a reproducing operation, the editor operates selector button L. Then, to search the video tape played by VTR 1 for a desired segment, jog mode setting button P is operated and the speed at which the tape is transported may be adjusted by operating jog dial R. For example, and with reference to the embodiment shown in FIG. 4 wherein VTR's 1, 2 and 3 have recorded thereon the same scene picked up by different cameras, a particular scene on VTR 1 is searched by operating the jog dial. When the desired scene is reached, VTR selector button M is operated to search the video tape played by VTR 2 for the same scene. Likewise, this scene recorded on the video tape played by VTR 3 is searched by operating VTR selector button N. By switching from one VTR to another, the editor may observe the same scene recorded on each video tape.

To transport the three video tapes in synchronism such that they reach a scene location simultaneously, the editor operates individual ones of VTR selector buttons L, M and N while operating jog dial R and observing the video information displayed on monitor 5. To advance or delay the movement of one source tape relative to the others, an advance button B or a delay button C may be operated to advance or delay the video tape transported by the selected VTR. This process is repeated until the editor observes that the desired scene location is played back substantially simultaneously from VTR's 1, 2 and 3. At that time, the editor operates synchronizing point setting button S to transfer the time codes read from VTR's 1, 2 and 3 to synchronized time code detector 7. These time codes thus comprise the aforementioned synchronized time codes.

Next, to carry out an edit operation now that the VTR's are synchronized, a desired segment on each VTR is identified while the VTR's operate concurrently and in synchronism. For example, a segment on VTR 1 is identified by operating VTR selector button L and jog dial R until the beginning of that segment is reached. At that time, edit start point button D is operated to transfer the time code on VTR 1 to buffer memory 42 and thence to data store 44 to identify the edit point. The time code corresponding to this edit point is displayed on time code display H. When the end of this segment is observed, the editor operates edit end point button E; and the time code then read from VTR 1 is transferred to buffer memory 42 and then to data store 44. The edit point identified by this time code is displayed by time code display H.

A similar operation is carried out to identify the beginning and ending of other desired segments which are reproduced from VTR 2 or VTR 3. Preferably, the time codes identifying the start and end edit points on VTR 2 are displayed by time code display I and the time codes identifying the start and end edit points on VTR 3 are displayed by time code display J. In the embodiment described above, the time codes reproduced from VTR 1 at each edit point regardless of whether it is VTR 1, VTR 2 or VTR 3 that is reproducing the video information, are stored in data store 44 whenever edit start point button D or edit end point button E is operated. Alternatively, the data store may supply the time codes actually read from VTR 2 or VTR 3 when edit points for those VTR's are selected.

If image processing of a reproduced segment of video information is desired, switch setting button F may be operated by the editor when the reproduced video signal is displayed on monitor 5. For example, and as shown in FIG. 4, operation of this button closes switch #4 of video switching matrix 10. In an alternative embodiment, image processor 8 may be connected to each of VTR's 1, 2 and 3 and, when a particular VTR is selected, as by operating selector button L, M or N, the video information reproduced by that VTR may be image processed for recording onto the edit tape by operating switch setting button F. When that button is operated, the monitor and the recording VTR are disconnected from the output of that play VTR and are connected to the output of the image processor.

Once edit information has been selected by the aforedescribed operation, it may be revised, if desired, simply by operating the appropriate VTR selector button L, M or N and then repeating the operation by which the source tape played by the selected VTR is searched for a new segment which then is selected by operating edit start button D and edit end button E. To revise the previously stored edit points, correction button G is operated by the editor. Furthermore, if a segment from VTR 2 is to be selected in place of a segment from VTR 1, thus changing the sequence in which the video segments are to be reproduced, a new sequence may be selected by operating the desired VTR selector buttons, edit start and edit end buttons D and E, switch button F and correction button G. Thus, revised edit information is generated and supplied to data store 44 to replace the previously selected edit data.

The cut-in and cut-out points for each segment to be recorded on the edit tape are selected by operating the recording VTR selector button O and jog dial R to position the edit tape at locations to which the edited segments are to be transferred. It is appreciated that the editor observes the information previously recorded on the recording VTR via monitor 5. When a desired cut-in point is reached, edit start button D is operated. This establishes the point on the edit tape at which the sequence of segments selected by the aforedescribed operation is recorded. In one embodiment, the cut-out point is determined automatically at the end of the sequence of transferred segments. In an alternative embodiment, the cut-out point may be selected simply by operating edit end button E when a desired point on the edit tape is observed on monitor 5 by the editor.

To observe the edit operation which has been selected without actually re-recording the selected segments on the edit tape, preview button U is operated. At that time, the edit information stored in data store 44 is used to control VTR's 1, 2 and 3 and switching matrices 10 and 20 such that the selected segments are displayed on monitor 5 in the sequence that has been chosen. If the editor wishes to revise any of this edit information, he may do so in the manner which has been discussed above. However, if the editor is satisfied with his selected editing, he need merely operate edit start button V and the segments which had been selected are reproduced from VTR's 1, 2 and 3, selectively processed by image processor 8 and re-recorded on the edit tape in the particular sequence which he determined.

While the present has been particularly shown and described with reference to preferred embodiments, it will be readily appreciated by those of ordinary skill in the art that various changes and modifications may be made without departing from the spirit and scope of the invention. For example, the source media have been described herein as video tapes. It is appreciated that other suitable source media may be used, such as video disks, or the like. Similarly, although only three play VTR's have been described, any desired number of play VTR's (or other source media) can be used to provide video information for recording on the edit tape. Likewise, although video tape is the preferred media for recording edited information, other media capable of recording may be used, such as a WORM disk, an erasable optical disk, or the like.

It is, therefore, intended that the appended claims be interpreted as covering the embodiments described herein, the alternatives mentioned previously and all equivalents thereto.

What is claimed is:

1. Apparatus for editing video program information from plural prerecorded source media onto an edit medium, wherein each source medium includes video program information of a common scene which may be recorded on that medium at a location relative to a beginning location thereof that differs from the recording location of that same common scene on another source medium, and each source medium includes address data representing discrete positions thereon, said apparatus comprising: playback means for playing back the program information of said common scene concurrently from the plural source media; monitor means for monitoring the played back program information; indicating means for indicating when a selected location in the common scene is played back substantially simultaneously from the plural source media, storage means for storing as synchronized address data the address data from each source medium representing the actual position at which said selected location is recorded on that source medium; select means for selecting edit points on individual ones of the source media; reference means for referencing the selected edit points to said synchronized address data; and control means for controlling the playback means to play back selected segments of video program information from respective source media for recording onto the edit medium in accordance with the referenced edit points.

2. The apparatus of claim 1 wherein said select means includes means for reading the address data from a source medium corresponding to a selected edit.

3. The apparatus of claim 2 wherein the reference means comprises means for determining each difference between the synchronized address data of a selected one of the source media and the synchronized address data of each of the remaining source media, means for sensing the address data from said selected one source medium at each edith point on each source medium, and combining means for combining each difference with the sensed address data to produce source media controlling address data for controlling the positioning of said source media to reach the selected edit points thereon in synchronism with each other.

4. The apparatus of claim 1 wherein the control means comprises switch means for supplying to the edit medium the program video information played back from individual ones of different source media when the respective referenced edit points are reached to record each selected segment.

5. The apparatus of claim 4 wherein the storage means stores the referenced edit point for each source medium and also stores sequence data representing the sequence in which the program video information played back from the individual source media are supplied to the edit medium, and said switch means connects the individual source media to said edit medium in the sequence represented by the stored sequence data at the times that the stored referenced edit points are reached.

6. The apparatus of claim 1 wherein the prerecorded video program information includes video and audio signals; and wherein the indicating means comprises manually operable means to be actuated when an operator observes when video pictures played back from the individual source media represent approximately the same location in the scene and when the audio signals played back from the individual source media represent substantially the same location in the scene to thereby generate a synchronizing signal at the time the individual source media reach substantially the same location in the scene simultaneously.

7. The apparatus of claim 6 further including means for selectively advancing or retarding one source medium relative to another to bring the source media into phase with each other so as to reach said same location in the scene simultaneously.

8. The apparatus of claim 1 wherein each source medium has prerecorded thereon video program information of plural scenes; and the storage means stores plural scene tables, each table including the referenced edit points identifying the respective segments of video program information to be played back from the individual source media and recorded onto the edit medium, sequence data identifying the order in which said segments are to be played back and scene identifying data representing the scene containing said segments.

9. The apparatus of claim 8 wherein the control means includes read out means for reading a selected scene table from said storage means to control the playing of the segments of video program information identified by the referenced edit points in said selected scene table in the order identified by the sequence data in said selected scene table.

10. The apparatus of claim 8 further comprising means for selectively changing the referenced edit points and the sequence data stored in a selected scene table.

11. The apparatus of claim 1 wherein said control means includes image processing means for processing the video signal played back from at least one of said source media to impart special video effects thereto prior to the recording thereof onto the edit medium.

12. The apparatus of claim 11 wherein segments of video program information are recorded at clock times; wherein said image processing means exhibits an inherent time delay; and said control means further includes means for identifying a record edit point on said edit medium at which the processed signal is to be recorded, time establishing means for establishing the clock time at which said record edit point on said edit medium and the referenced edit point at which said selected segment of video program information is played back from a source medium and processed by said image processing means both occur, and modifying means for modifying the occurrence of one of said record edit point and said referenced edit point relative to said established clock time to compensate for said inherent time delay such that the processed video signal is recorded at said record edit point.

13. The apparatus of claim 12 wherein said control means additionally includes play storage means for storing a playback table including the referenced edit points identifying the respective segments of video program information to be played back from a source medium and image processed for recording and for storing clock data identifying clock times which correspond to each referenced edit point, and record storage means for storing a record table including the record edit points identifying those points on said edit medium at which each image processed segment of video program information is to be recorded and for storing clock data identifying clock times which correspond to each re-cord edit point; and wherein the modifying means comprises means for reading the stored playback table and the stored record table, clock generator means for generating clock time signals while playing back video program information from said source media and recording segments on said edit medium such that each referenced edit point and each record edit point is reached when the clock generator means generates clock time signals corresponding thereto, and adjustment means for adjusting the clock data stored in one of said playback or record tables by an amount substantially equal to said inherent time delay.

14. The apparatus of claim 13 wherein the adjustment means comprises subtracting means for subtracting an amount substantially equal to said inherent times delay from the clock data corresponding to the references edit point at which the segment of video program information to be processed is played back from a source medium to thereby produce modified clock data; and wherein said control means further includes means for comparing the generated time clock signals to the modified clock data to determine when the segment of video program information to be processed is in position to be played back.

15. A method of editing video program information from plural prerecorded source media onto an edited record medium, wherein each source medium includes video program information of a common scene which may be recorded on that medium at a location relative to a beginning location thereof that differs from the recording location of that same common scene on another source medium, and each source medium includes address data representing discrete positions thereon, said method comprising the steps of: playing back concurrently from the plural source media the program information of said common scene; monitoring the played back program information; determining when a selected location in the common scene is played back substantially simultaneously from the plural source media; storing as synchronized address data the address data from each source medium representing the actual position at which said selected location is recorded on that source medium; selecting edit points on individual ones of the source media; referencing the selected edith points to said synchronized address data; and controlling the playing back of selected segments of video program information from respective source media for recording onto the edited record medium in accordance with the referenced edit points.

16. The method of claim 15 wherein the step of selecting edit points include providing the address data identifying each edit point on each source medium.

17. The method of claim 16 wherein the step of referencing the selected edit points comprises determining each difference between the synchronized address data of a selected one of the source media and the synchronized address data of each of the remaining source media, providing the address data from said selected one source medium which identifies the position reached by said selected one source medium for each edit point on each source medium, and combining each difference with the last-mentioned address data to produce source media controlling address data for controlling the positioning of said source media to reach the selected edit points thereon in synchronism with each other.

18. The method of claim 15 wherein the step of controlling comprises supplying to the edited record medium the program video information played back from individual ones of different source media when the respective referenced edit points are reached so as to record each selected segment from the source media.

19. The method of claim 18 wherein the step of controlling further comprises storing the referenced edit point for each source medium, storing as sequence data the sequence in which the program video information played back from individual source media are supplied to the edited record medium, and connecting to said edited record medium by way of a switching matrix the individual source media in the sequence represented by the stored sequence data at the times that the stored referenced edit points are reached.

20. The method of claim 15 wherein the prerecorded video program information includes video and audio signals; and wherein the step of determining when a scene location in the common scene is played back substantially simultaneously from the plural source media comprises observing when video pictures played back from the individual source media represent approximately the same location in the scene, detecting when the audio signals played back from the individual source media represent substantially the same location in the scene, and generating a synchronizing signal at the time the individual source media reach substantially the same location in the scene simultaneously to thereby identify the synchronized address data of each source medium.

21. The method of claim 20 wherein the steps of observing and detecting each includes the step of selectively advancing or retarding one source medium relative to another to bring the source media into phase with each other so as to reach said same location in the scene simultaneously.

22. The method of claim 15 wherein each source medium has prerecorded thereon video program information of plural scenes, and said method further comprises storing plural scene tables, each scene table including the referenced edit points identifying the respective segments of video program information to be played back from the individual source media and recorded onto the edited record medium, sequence data identifying the order in which said segments are to be played back and scene identifying data representing the scene containing said segments.

23. The method of claim 22 wherein the step of controlling comprises reading a selected scene table from said edit record, and playing back the segments of video program information identified by the referenced edit points in said selected scene table in the order identified by the sequence data in said selected scene table.

24. The method of claim 22 further comprising the step of selectively changing the referenced edit points and the sequence data stored in a selected scene table.

25. The method of claim 15 wherein said step of controlling includes image processing the video signal played back from at least one of said source media to impart special video effects thereto, and recording the processed video signal onto the edited record medium when a selected segment of video program information is played back from said at least one source medium.

26. The method of claim 25 wherein segments of video program information are recorded at clock times; wherein said image processing exhibits an inherent time delay; and wherein said step of recording includes identifying a record edit point on said edited record medium at which the processed signal is to be recorded, determining the clock time at which said record edit point on said edited record medium and the referenced edit point at which said selected segment of video program information is played back from a source medium both occur, and modifying the occurrence of one of said record edit point and said referenced edit point relative to said clock time to compensate for said inherent time delay such that the processed video signal is recorded at said record edit point.

27. The method of claim 26 further comprising the steps of storing a playback table including the referenced edit points identifying th respective segments of video program information to be played back from a source medium and image processed for recording and clock data identifying clock times corresponding to each referenced edit point; and storing a record table including the record edit points identifying those points on said edited record medium at which each image processed segment of video program information is to be recorded and clock data identifying clock times corresponding to each record edit point; and wherein the step of modifying comprises reading the stored playback table and the stored record table, generating clock time signals, playing back video program information from said source media and recording segments on said edited record medium in synchronism with said generated clock time signals such that each referenced edit point and each record edit point is reached when the stored clock data corresponding thereto is generated, and adjusting the clock data in one of said playback or record tables by an amount substantially equal to said inherent time delay.

28. The method of claim 27 wherein the step of adjusting comprises producing difference clock data by subtracting an amount substantially equal to said inherent time delay from the clock data corresponding to the referenced edit point at which the segment of video program information to be processed is played back from a source medium such that when a generated time clock signal is equal to the difference clock data the segment of video program information to be processed is positioned to be played back.

* * * * *